US009930064B1

(12) United States Patent
Sherwell et al.

(10) Patent No.: US 9,930,064 B1
(45) Date of Patent: Mar. 27, 2018

(54) NETWORK MANAGEMENT SECURITY AND PROTECTION SYSTEM

(71) Applicants: Daniel R. Sherwell, Falls Church, VA (US); Kendell D. Zahn, Purcellville, VA (US)

(72) Inventors: Daniel R. Sherwell, Falls Church, VA (US); Kendell D. Zahn, Purcellville, VA (US)

(73) Assignee: Blue Star Software, Falls Church, VA (US)

( * ) Notice: Subject to any disclaimer, the term of this patent is extended or adjusted under 35 U.S.C. 154(b) by 0 days.

(21) Appl. No.: 15/360,892

(22) Filed: Nov. 23, 2016

(51) Int. Cl.
*H04L 29/06* (2006.01)
*H04L 12/24* (2006.01)
*H04L 29/08* (2006.01)
*H04L 12/26* (2006.01)
*G06F 21/57* (2013.01)
*G06F 9/445* (2018.01)

(52) U.S. Cl.
CPC ........ *H04L 63/1441* (2013.01); *G06F 21/572* (2013.01); *H04L 41/046* (2013.01); *H04L 41/0853* (2013.01); *H04L 41/20* (2013.01); *H04L 41/28* (2013.01); *H04L 43/10* (2013.01); *H04L 67/34* (2013.01); *G06F 8/61* (2013.01); *G06F 2221/033* (2013.01)

(58) Field of Classification Search
CPC ........ G06F 21/575; G06F 21/572; G06F 9/44; G06F 9/4416; G06F 11/1417
USPC .......................................................... 726/23
See application file for complete search history.

(56) References Cited

U.S. PATENT DOCUMENTS 6,185,678 B1* 2/2001 Arbaugh ............... G06F 21/575
713/2
2012/0143821 A1* 6/2012 Mallya ................ H04L 41/0853
707/639

* cited by examiner

*Primary Examiner* — Syed Zaidi
(74) *Attorney, Agent, or Firm* — Michael L. Greenberg, Esq.; Greenberg & Lieberman, LLC

(57) ABSTRACT

A system for the monitoring, management, and protection of networks and network-connected devices is described. The system employs an agent configured to run on each network-connected device, as well as a management console in communication with the agent. The management console functions in tandem with the agent(s). The agent(s) broadcasts heartbeat messages to periodically check-in with the management console in order to determine if any changes have been made to any software on the network-connected device. Additionally, challenges, based on complex code, are periodically transmitted between the management console and the agent(s) in order to verify the authenticity of the agent(s).

18 Claims, 1 Drawing Sheet

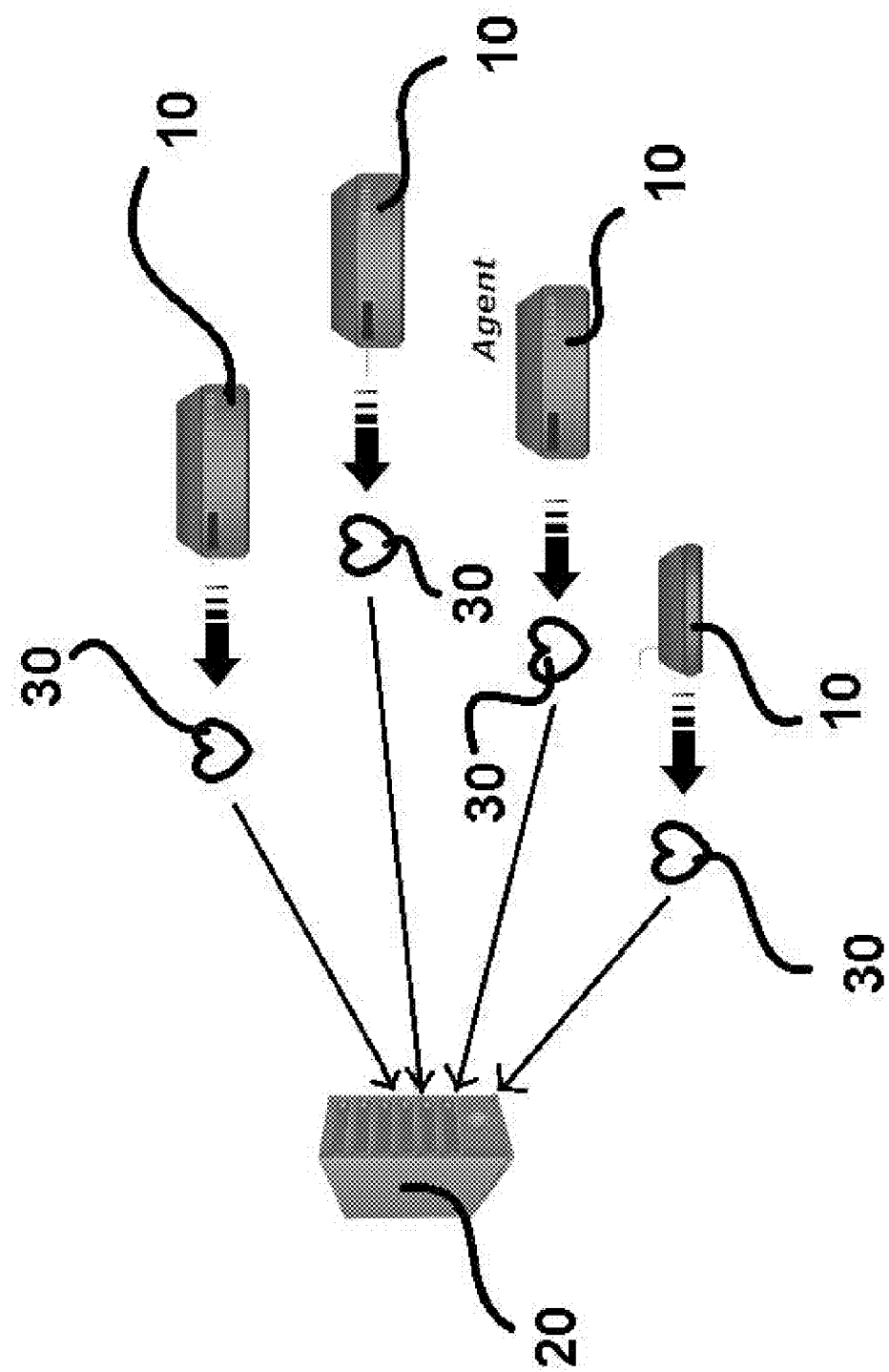

NETWORK MANAGEMENT SECURITY AND PROTECTION SYSTEM

FIELD OF THE PRESENT INVENTION

The present invention relates to network administration and security, and more specifically, the present invention relates to the instantaneous detection of changes to any network-connected device software, including the implementation of malicious software.

BACKGROUND OF THE PRESENT INVENTION

Networks, regardless of their complexity, can be susceptible to a variety of malicious attacks. Unfortunately, even with a dedicated team of qualified network administrators, a network can become compromised, especially in cases in which a network device's boot software is replaced without an administrator noticing. In such cases, malicious software, often containing backdoors, can be left to run on the network device perpetually, leaving the system open to future attacks at any time.

The current network device security and management systems on the market only verify the integrity of the system software once, on boot-up. While this can ensure the system is in a known good state at boot-up, the device is vulnerable to an attack that happens once the system has completed start-up.

Some devices try to provide a way to verify data after the system has been booted. For example, some manufacturers allow an administrator to copy a memory dump from the device to a remote system for analysis. However, if malicious software is installed, the mechanism that copies the memory dump to a remote system can be modified to provide a copy of what the memory should look like, as opposed to what it really does look like. Command-line tools that report common areas of interest such as memory usage or a process list can be easily modified so that malicious processes and memory usage are hidden.

Thus, there is a need for a software-based system, embodied as an agent, which scans the network device continuously, so that even if it is compromised, the agent can detect changes made to the network device and alert the administrator through a management console. Such a system preferably compares the present state of the agent and device against a known-good backup. The backup may also preferably be used to restore the system in the event of an attack. The management console is preferably configured to alert the administrator(s) remotely in the event of an attack, and may employ email, text, audio, page, or other means to alert the administrator.

SUMMARY OF THE PRESENT INVENTION

The present invention is a system of network management that facilitates real-time monitoring, capable of providing alerts to system administrators relating to any and all changes made to system code of any device connected to the network. The system of the present invention employs software, embodied in the form of agents, as well as a management console, in order to monitor changes made to network-connected devices. The management console provides the status of the network-connected devices running the agent, and serves to alert system administrators of any attack made to the network-connected devices.

The software of the present invention does not cross-reference any changes with known malicious software. Unlike anti-virus systems, which rely on maintaining a blacklist of known malicious software and patterns known to belong to malicious software—the software of the present invention takes the whitelist approach—it knows exactly what the operating system memory should look like when in a good state. Any deviations from the known good state are due to an attack.

The present invention employs heartbeat messages and challenges as an effective means of authenticated communication between agents and the management console.

BRIEF DESCRIPTION OF THE DRAWING

The present invention will be better understood with reference to the appended drawing sheets, wherein:

FIG. 1 exhibits a diagram of the system structure of the present invention.

DETAILED DESCRIPTION OF THE PREFERRED EMBODIMENT

The present invention is a network security and management system configured for use on a multitude of network device types. The present invention primarily consists of two components: an agent (10), which, as software, runs on the network-connected device, and a management console (20), which runs on a separate computer. The management console (20) provides a user interface for the network operator that provides status information, alerts, and logging for each network device upon which an agent (10) is installed.

The agent (10) is configured to continuously scan for changes to potential target areas of a network device, such as the executable code, function pointers, and the bootstrap software. Additionally, the agent (10) is configured to monitor for changes to the CPU's memory management unit (MMU), the file system, and other volatile and nonvolatile storage. The agent (10) of the present invention has direct, low-level access to the system hardware and memory, giving the agent (10) the ability to locate sophisticated malicious software and other changes that could be otherwise hidden from a network operator.

The management console (20) stores a known good copy of the bootstrap software and operating system for the network device, along with the specific run-time characteristics of the network-connected device (such as the address at which the operating system is loaded) in the event of a future security issue. Each time a network-connected device running the agent (10) of the present invention is booted, the management console (20) is alerted and recreates the operating environment for that specific network-connected device.

The agent (10) of the present invention verifies the integrity of the network-connected device software by dividing each of the vulnerable areas of the operating system into smaller, separate regions, and computing a cryptographic hash of each region. Each region preferably has a randomly chosen starting address and size. The computed hash of the region is sent to the management console (20). The management console (20) computes a hash of the same region. If the hashes differ, the management console (20) issues an alert to the network operator. Once all regions on the network-connected device have been scanned and verified by the management console (20), the process repeats itself, dividing up the regions again in another random way. The monitoring process executed by the system of the present invention is repeated as long as the network-connected device remains operating.

The agent (10) of the present invention communicates with the management console sending a heartbeat message (30) at regular intervals to the management console (20). The heartbeat messages (30) include the memory region information (such as the start and size), along with the cryptographic hash computed on the network device for that region, and may also be configured to include other network-connected device status information.

The memory management unit (MMU) of the network device is responsible for controlling virtual to physical memory mappings, as well as permissions to access memory. The agent (10) verifies the integrity of the MMU by monitoring for any changes.

The management console (20) is configured to issue an alert to the network operator (via email, text, automated message, etc) under the following circumstances:

1. If the heartbeat message (30) stops coming from the network device, indicating either communication with the network-connected device has been disrupted, or the agent (10) running on the network-connected device has been disabled.
2. If the hash of the memory region does not match between the network-connected device (as recorded by the agent (10)) and the management console (20), indicating memory has been modified, either by an attempted attack or a software bug.
3. An attempt has been made to log into the network-connected device.
4. The network-connected device's running or persistent configuration settings have been changed.
5. A change has been made, such as to the MMU, the non-volatile storage containing the file system, bootstrap software, or device configuration settings of the network-connected device.

Since changes to the network-connected device are constantly monitored by the present invention, any attempt to exploit vulnerability in order to alter network device behavior can be captured, even if the vulnerability is not known by the general public or manufacturer.

Also, any attempt to make malicious software persist through a power-cycle can be captured, as the non-volatile storage areas are also continuously monitored for changes. Any at attempt to tamper with the agent (10) is also captured, as the regular heartbeat messages (30) would be interrupted.

The agent (10) of the present invention is intended to be run on any network-capable connected device, such as those listed in the definition below. Due to technical constraints, the same agent (10) code cannot be run across all devices. Instead, each network-connected device is configured to host a dedicated agent (10) based on the device's system architecture, which accounts for differences in CPU architecture, storage device characteristics, physical memory layout, and the built-in capabilities of the hardware and OEM software. However, the general idea and implementation of the agent (10) remains the same across all devices, which includes verification of OEM software, continuous monitoring of the OEM software to ensure no changes have taken place at run-time, and reporting any anomalies to a central management console (20).

The management console (20) stores a backup of the OEM bootstrap software and the OEM operating system on the machine running the management console (20). There is one backup for each version of software used on the device. For example, if two network-connected devices share the same version of software, there needs to be only one backup of that version of the software on the management console (20).

These backup copies of the OEM software are used by the management console (20) in order to remotely and independently verify the integrity of the OEM software on each connected device. The management console (20) will use the backup copy of the OEM software to create a snapshot of the memory on the network-connected device from scratch. The same effect could be achieved by allowing the network device to boot, and copying a snapshot of the memory on the network-connected device to the management console (20). The management console (20) does not execute the run-time environment. Instead, the management console (20) simply uses the snapshot compute hashes for comparison to hashes received from the agent (10).

The management console (20) accounts for changes done by the OEM software itself. For example, the device manufacturer may have designed the system software to relocate itself each time the device is booted. (This is normally done to mitigate/deter exploitation of certain security vulnerabilities). During this relocation procedure, the OEM software may also make modifications to the operating system in support of the relocation. For example, it may need to update pointers to data or code, or individual instructions that load/store data. When the agent (10) starts, it retrieves this relocation information from the device, and then sends it to the management console (20) so the management console (20) can perform the same changes on its copy of the OEM software. The agent (10) and management console (20) are preferably configured to independently perform hashes of memory contents (such as code and certain pointers) that are expected not to ever change, and compare the results over time to determine if malicious changes have been made.

Because the management console (20) uses these backup images frequently, they are stored locally on the management console (20) for optimal performance. At some point in the future, the present invention may store copies of the OEM software in the cloud so that when the network-connected device software is updated, the management console (20) can download a copy of the OEM software from the cloud. The backup of the OEM software on the management console (20) is primarily employed for run-time checking the integrity of the system, and alerting the administrator of a failure. It is also used to automatically restore any modifications made to the OEM software due to an attack.

If the OEM software on the network-connected device has been changed, the agent (10) will automatically restore these files/images from the backup. If the agent (10) has been disabled, manual intervention will be required to restore the software using the procedure recommended by the manufacturer. The administrator will know the agent (10) is not running because no heartbeat message (30) will be coming from the device when the device is powered on. The backup of the OEM software will be stored locally on the management console (20) in the file system, so it could be used by the administrator for manual recovery purposes as well.

The agent (10) acts as a client to the management console (20), and establishes a TCP socket connection to the management console (20) when the agent (10) is started, using Transport Layer Security (TLS) for encryption (the same encryption used for https). The underlying communication between the agent (10) and management console (20) is a proprietary protocol. The agent (10) can leverage the built-in communication and encryption capabilities of the software running on the network-connected device in order to create socket connections and encrypt the communication. If these capabilities do not exist in the network-connected device software, they will be included in the agent (10) software. The network-connected device is required to have at least the capability of communicating using TCP/IP.

The heartbeat message (30) sent from the network-connected device preferably performs three functions—(1) it lets the management console (20) know that the network-connected device is online, (2) the agent (10) hasn't been disabled, and (3) it contains the data for validating the device software of the network-connected device. Specifically, it contains a memory location and length (in bytes) to describe an area of memory, as well as the hash value corresponding to that memory area. The management console (20) uses the data in the heartbeat message (30) and computes a hash of the same memory area in its memory snapshot of the device. If the hashes match, the management console (20) knows the device has not been modified. If the hashes do not match, the management console (20) reports the problem to the administrator(s) while also issuing a binary search to locate the specific areas of memory that have been altered.

The agent (10) will be installed on the device, either in the file system or in the leftover area of storage, depending on the device architecture. The software agent (10) itself will be validated at startup to ensure it hasn't been modified, with the hash sent back to the management console (20) for verification. At run-time, the agent software (10) will be continuously monitored as well.

In order to validate the agent (10), the management console (20) periodically sends a "challenge" to the agent (10) to ensure the agent (10) hasn't been replaced with an impostor that that simply reports "good news" to the management console (20). The challenge consists of native code to be executed on the network-connected device. To pass the challenge, the real agent (10) simply needs to execute the code as it is, and send back the result to the management console (20) within a certain time period. If the result doesn't match the expected result, the device and/or agent (10) can be assumed to have been compromised, and the management console (20) can immediately alert the administrator.

The "challenge" is effectively a large block of code which is randomly generated by and from the management console (20) on a periodic basis. If the network-connected device has not been compromised, execution would follow a code path that ultimately produces the correct result to the challenge. The result may be a hash of a specific memory area or multiple memory areas; it may be the based on the status of certain registers, a hash of the agent (10) in memory, or any number of alternatives or combinations of previously listed items. Only the management console (20) knows in advance what the result of the challenge should be. Once the result is computed, it is sent back to the management console (20) for verification.

In order to arrive at the correct hash calculation, the code performs a number of complex arithmetic operations, while also reading the status of CPU registers, and/or memory contents. Each of these operations determines the outcome of multiple, conditional code branches. Only when the correct set of branches are followed is the correct result produced. The code block also contains a number of incorrect code paths that will ultimately produce the wrong result.

To attack the agent (10), malicious software would need to (1) replace the agent (10) with an altered version that produces heartbeat messages (30) and good hashes, and (2) duplicate the result of the challenge. There are a number of reasons the challenge would be difficult to attack. Suppose that the agent (10) is compromised, and the attacker is smart enough to continue sending heartbeat messages (30) with good hashes to falsely indicate the real agent (10) is still running, and that no changes have been detected. In order to do this, the attacker must ensure that the changes it has made to the OEM software or the software of the agent (10) cannot be detected. This can be achieved by temporarily restoring the OEM code, making a hash of the memory area and sending the heartbeat message (30), and then restoring the malicious code.

When the challenge is received, however, the challenge code must be completely reversed and thoroughly analyzed by the malicious software in order to determine what areas of memory will be hashed, what registers are read, and so forth. It is not possible for the malicious software to know the correct result in advance, since the challenge provided by the system of the present invention is randomly generated each time. The procedure to analyze the code would be considerably complex, requiring lots of computing time and memory. It would also be risky due to the possibility of producing an error, and being detected. The only way for malicious software to ensure it is not discovered is to completely uninstall itself before the challenge is executed. Even in doing so, it could still be detected since the state of CPU registers may have been changed as a result of uninstalling itself, or the agent (10) may no longer produce heart beat messages (30), and a number of other anomalies that could be easily detected by the agent (10) or challenge code.

Once the management console (20) determines a problem exists, the management console (20) issues an alert to all assigned administrators through remote means if configured, such as a text message, page, or email. If a remote alert is not possible due to the network configuration, the management console (20) will issue audible and visual alerts, and run custom scripts. The administrator(s) can also utilize the management console (20) interface to review device status of the network-connected device, as well as review the logs.

It should be understood that the management console software (20) runs in the Linux operating system environment. Protection of the management console software (20) is limited to the security mechanisms built into the Linux operating system as well as precautions taken by the administrator. The software of the present invention uses a whitelist approach (the OEM bootstrapping and operating system software), therefore no configuration of the whitelist needs to be set manually by the administrator.

The configuration of the agent (10) can preferably be changed through the management console (20) by an administrator. The configuration includes the IP address and TCP port to contact the management console (20) when the agent (10) starts. The software of the agent (10) will automatically tune itself on startup as to not create a noticeable impact to the performance of the device it is installed on. However, the present invention allows for the administrator to manually override performance-tuning parameters via the management console (20).

The administrator(s) may customize the management console (20) including the list of persons that receive alert notifications and the means by which they are notified. Log data, both from the management console (20) and the agent (10), is written to the customers' enterprise logging system. Each of the agents (10) will store its log separately, as will the management console (20).

For clarity, the following definitions should be employed with respect to this specification:

"Device"—a network-connected device, in particular, embedded devices such as a network switch, wireless repeater, network area storage device, network firewall, IoT devices such as smart TVs, smart thermostats, smart refrigerators, home cameras and security devices, network routers (commercial, home, wireless, etc.), etc. This list does not include non-embedded computing systems such as desktops, laptops, and servers.

"Bootstrap software"—the initial code that is executed on a device when it is first powered on. It is provided by the device manufacturer. The bootstrap software is used to load the device's main operating system software. Sometimes this software is also referred to by the term "bootrom" or "firmware." On certain devices, the bootstrap software and operating system may be one image, rather than treated as separate software images.

"Operating system"—the main software on the device that is responsible for the device operation and interaction. This software is provided by the device manufacturer. On embedded systems, the operating system is a single file or image that contains the kernel, device drivers, and supporting software, rather than multiple files as found on systems running Apple OSX, Linux, or Microsoft Windows.

"OEM software"—the original equipment manufacturer's software that runs on the device. We use this as a general term to include all of the manufacturer's provided software: the bootstrapping software, the operating system, and any other software provided/installed on the device by the device manufacturer "Management console"—a computer system, separate from the network device, which communicates with the agent (10) and provides a user interface for the agent (10). It is also responsible for issuing alerts to the device administrator(s).

"Agent"—The agent (10) is software that runs native on a network-connected device, alongside the manufacturer's software. The agent (10) is responsible for monitoring the manufacturer's software to ensure no malicious changes have been made to the OEM software that runs on the device.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A network security and management system comprising:
   at least one agent, said at least one agent running as software on at least one network device connected to a network;
   a management console, said management console in communication with said at least one agent via said network;
   at least one processor, said at least one processor in communication with said management console;
   memory, said memory in communication with said management console and said at least one processor;
   wherein said management console is configured to monitor the status of said at least one network device;
   wherein said management console is configured to detect changes made to any code disposed on said at least one network device via said at least one agent;
   wherein said management console is configured to store a known-good copy as a backup of the following elements of said at least one network device via said at least one agent: bootstrap software, operating system, and the address at which said operating system is loaded to said at least one network device;
   heartbeat messages, said heartbeat messages configured to be transmitted from said at least one agent to said management console at regular intervals;
   wherein said heartbeat messages contain memory region information;
   wherein said heartbeat messages contain a cryptographic hash pertaining to each region;
   wherein said heartbeat messages convey comparison data to said management console to determine if changes have been made to the at least one network device running said at least one agent;
   wherein one iteration of said at least one agent is configured to scan the memory management unit of one iteration of said at least one network device to verify the integrity of the memory management unit monitoring any changes made to said memory management unit since the prior boot of one iteration of said at least one network device;
   a network operator alert, said network operator alert conveyed to a network operator from said management console when said heartbeat message is not received;
   wherein said network operator alert is conveyed to said network operator when a log-in attempt is made to said at least one network device;
   wherein said management console is configured to dispatch said backup to the network operator periodically when requested;
   wherein said management console is configured to send software challenges to said one iteration of said at least one agent; and
   wherein the software challenges are composed of conditional code branches, and only when the software follows the correct set of branches is the correct result produced.

2. The system of claim 1, wherein said heartbeat messages contain status information pertaining to one iteration of said at least one network device.

3. The system of claim 1, wherein said network operator alert is conveyed to said network operator when persistent configuration settings of one iteration of said at least one network device have been altered.

4. The system of claim 1, wherein said network operator alert is conveyed to said network operator when a change has been made to said memory management unit.

5. The system of claim 1, wherein said network operator alert is conveyed to said network operator when a change has been made to non-volatile storage containing the file system of one iteration of said at least one network device.

6. The system of claim 1, wherein said network operator alert is conveyed to said network operator when a change is made to configuration settings of any iteration of said at least one network device.

7. The system of claim 1, wherein said network operator alert is conveyed to said network operator when a change is made to said bootstrap software of any iteration of said at least one network device.

8. The system of claim 1, wherein said network operator alert is conveyed via one of the following: a text message, an email, and an automated message.

9. The system of claim 2, wherein said network operator alert is conveyed to said network operator when persistent configuration settings of the network device have been altered.

10. The system of claim 2, wherein said network operator alert is conveyed to said network operator when a change has been made to said memory management unit.

11. The system of claim 1, wherein said management console periodically sends a "challenge" to said at least one agent to ensure said at least one agent has not been replaced with an impostor.

12. The system of claim 11, wherein said challenge is a large block of code which is randomly generated by said management console on a periodic basis.

13. The system of claim 12, wherein said challenge is composed of conditional code branches and only when said at least one agent follows the correct set of branches is the correct result produced.

14. The system of claim 12, wherein said management console knows in advance the result of said challenge sent to said at least one agent.

15. A method for managing the security of network devices in communication with a network comprising:
   installing agent software on each network device connected to the network;
   installing management console software to a centralized computer in communication with the network;
   wherein the centralized computer is equipped with a processor;
   wherein the centralized computer is equipped with memory;
   establishing a connection between each iteration of the agent software with the management console;
   the management console backing up a known good copy of an operating system software of each network device via the agent software;
   the management console backing up a known good copy of bootstrap software of each network device via the agent software;
   the management console backing up run-time characteristics specific to the network device via the agent software;
   booting the network device;
   the agent software alerting the management console of the boot;
   the management console recreating the operating environment of the network device tailored to the specific network device;
   the agent software continuously scanning the network device for changes to executable code, function pointers, and bootstrap software of the network device;
   the agent software conveying a heartbeat message to the management console to indicate the current status of the network device in real time;
   wherein the heartbeat message consists of a returned cryptographic hash of each region of the operating system software of the network device;
   the management console alerting a network operator upon detection of a change made to the network device; and
   the management console periodically sending a challenge to the agent software to ensure that the agent software has not been replaced with an impostor.

16. The method of claim 15, further comprising:
   the management software randomly generating a large block of code for the challenge.

17. The method of claim 15, wherein the challenge is composed of conditional code branches, and only when the agent software follows the correct set of branches is the correct result produced.

18. The method of claim 17, further comprising:
   the management console knowing, in advance, the result of the challenge sent to the agent software.

* * * * *